United States Patent Office 3,478,019
Patented Nov. 11, 1969

3,478,019
HALOGENATED CYCLOPROPYL, CYCLOPROPENYL AND OXOCYCLOPROPENYL-1-HYDROXY ESTRATRIENES AND DERIVATIVES THEREOF
John A. Edwards, Los Altos, Calif., assignor to Syntex Corporation, Panama, Panama, a corporation of Panama
No Drawing. Filed Sept. 15, 1967, Ser. No. 668,197
Int. Cl. C07c *169/06, 169/10;* A61k *27/00*
U.S. Cl. 260—239.55         13 Claims

ABSTRACT OF THE DISCLOSURE

17α-dihalocyclopropyl-, dihalocyclopropenyl-, and oxocyclopropenyl-1-hydroxy-estratrienes useful as estragenic agents.

The present invention relates to novel steroids. More particularly, this invention relates to novel estratrienes of the following Formula A:

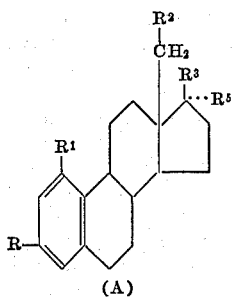

(A)

wherein, $R^5$ is selected from the groups

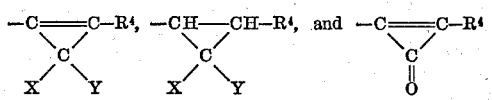

each of X and Y is chloro or fluoro;
each of R, $R^1$ and $R^3$ is hydroxy and the conventional hydrolyzable esters thereof, lower alkoxy, cyclopentyloxy, cyclohexyloxy, tetrahydrofuran-2'-yloxy or tetrahydropyran-2'-yloxy;
$R^2$ is hydrogen, methyl, ethyl or n-propyl; and
$R^4$ is hydrogen, methyl, ethyl, chloro, fluoro or trifluoromethyl.

The term "conventional hydrolyzable ester" as used herein denotes those hydrolyzable ester groups conventionally employed in the steroid art, preferably, those derived from hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-diemthylglutarate, acetoxyacetate, 2-chloro-4-nitrobenzoate, aminoacetate, diethylaminoacetate, piperidinoacetate, β-chloropropionate, trichloroacetate, β-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

The term "lower alkoxy," as used herein, refers to a straight or branched chain alkoxy group having 1 to about 6 carbon atoms such as methoxy, ethoxy, and the like.

The novel steroids provided by this invention are excellent estrogenic agents having a high degree of activity. They are useful in the treatment of the various conditions in which such agents are indicated, such as estrogen deficiencies, menopause, and the like. These compounds can also be used in veterinary medicine in the same manner as known estrogens and in the control and regulation of fertility. In addition, these novel steroids demonstrate anti-androgen activity. They can be administered either orally or percutaneously together with conventional pharmaceutical excipients at dosage rates of from about 3.0 μg. to about 2 mg./kg./day. However, dosages below or above this range can also be used, the most favorable dosage being dependent upon the purpose for which it is administered and the response thereto.

The compounds of the present invention wherein $R^5$ is a dihalocyclopropenyl group can be obtained by treating a 17α-alkynyl estratriene of the general formula A with a dihalocarbene generating agent. This process can be represented as follows using for simplicity and brevity only the applicable D ring of the steroid molecule:

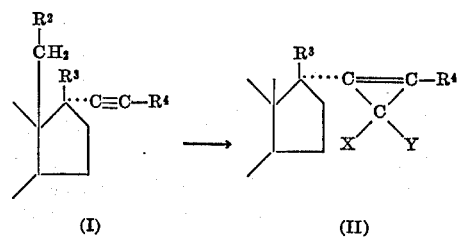

(I)                          (II)

wherein, $R^2$, $R^3$, $R^4$, X and Y are as defined above.

In the practice of the foregoing transformation, an estra-1,3,5(10)-triene of the general Formula A having a 17α-alkynyl group or 17α-halo-substituted alkynyl group, e.g. ethynyl, 1-propynyl, 1-butynyl, chloroethynyl, fluoroethynyl, trifluoropropynyl, and the like, is treated with a dihalocarbene generated, for example, from alkali metal salts of haloacetic acid, e.g. sodium trichloroacetate, sodium chlorodifluoroacetate, and sodium dichlorofluoroacetate to yield the 17α-dihalocyclopropenyl derivatives of partial Formula II. The reaction is executed under anhydrous conditions in an inert organic solvent such as diglyme (diethyleneglycol dimethyl ether), triethyleneglycol dimethyl ether, or the like. The product forms directly and may be readily separated from the reaction mixture by conventional methods.

In the practice of the above process, in lieu of steroids of partial Formula I, there can be used estra-1,3,5(10)-trienes having a 17α-alkenyl or halo-substituted alkenyl group in which case there are obtained novel 17α-dihalocyclopropyl steroids of the following partial Formula III:

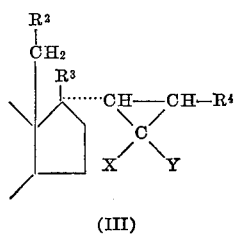

(III)

wherein, $R^2$, $R^3$, $R^4$, X and Y are as defined above. Alternatively, the steroids of Formula III can be obtained by subjecting a 17α-dihalocyclopropenyl steroid of Formula II to hydrogenation using, for example, a hydrogenation catalyst such as palladium-on-charcoal, and the like.

Acid hydrolysis of the 17α-dihalocyclopropenyl estratrienes of Formula II yields the novel 17α-cyclopropenones of the present invention which can be illustrated as follows:

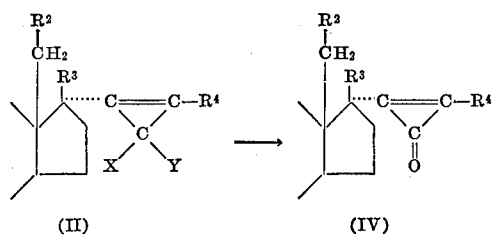

(II)      (IV)

wherein $R^2$, $R^3$, $R^4$, X and Y are as defined above. This transformation can be accomplished by subjecting a steroid of Formula II to treatment with cold hydrochloric acid, aqueous formic acid, and the like for a few minutes, e.g. about 5–30 minutes or more, to furnish a 17α-cyclopropenone of Formula IV.

The requisite starting material for the preparation of the compounds of the present invention is readily prepared from the corresponding 17-keto compound through conventional methods, e.g. treatment with acetylene and potassium t-butoxide, use of dichloroethylene and methyl lithium, use of alkynyl magnesium halides, and the like. The starting materials having a 17α-alkenyl or halo-substituted alkenyl group are preferably obtained from the corresponding 17α-alkynyl or 17α-halo-substituted alkynyl compounds through controlled hydrogenation according to conventional procedures.

The resulting 17β-hydroxy-17α-alkenyl or -17α-alkynyl starting materials can be converted to the corresponding 17β-acyloxy, 17β-tetrahydropyranyloxy or 17β-tetrahydrofuranyloxy derivatives via conventional methods prior to practicing the process of this invention or can be subjected thereto directly and, if desired, esterified or etherified thereafter, preferably the former.

The substituent in the 1-position and the 3-position of the estratriene nucleus of the compounds of the present invention can be a hydroxy group or an etherified, e.g. methoxy, tetrahydropyranyloxy, etc., or esterified, e.g. acetoxy, benzoyloxy, etc., derivative thereof. These derivatives can be formed prior to the principal reaction of the present invention or can be formed thereafter via conventional methods, preferably prior thereto.

Suitable methods for the preparation of the starting compounds to obtain the compounds of the present invention are set forth in, for example, U.S. Patents 3,256,273, 3,262,949, 3,290,297, 3,300,484 and 3,318,925. Starting material for compounds of the present invention having an 18-alkyl group can be obtained by treatment of an 18-alkylestra-1,3,5(10)-triene with lead tetraacetate [Journal of the American Chemical Society, 80, 5683 (1958)] followed by treatment with trifluoroacetic anhydride [Chemische Berichte, 97 1926(1964)].

The following examples are provided to illustrate the practice of the present invention.

Example 1

To a refluxing solution of 6.2 g. of 1,3-dimethoxy-17α-ethynylestra-1,3,5(10)-trien-17β-ol 17-acetate in 50 ml. of anhydrous diglyme, there is added dropwise over a period of about 80 minutes a heated (about 60° C.) solution of 20.72 g. of sodium chlorodifluoroacetate in 50 ml. of anhydrous diglyme under nitrogen and with stirring. After all the sodium chlorodifluoroacetate is added, the reaction mixture is cooled and filtered. The filtrate is evaporated to dryness under reduced pressure. The residue is dissolved in hexane and chromatographed on 300 g. of Florisil (synthetic magnesium silicate) eluting with hexane:ether to furnish 1,3-dimethoxy-17α - (2',2' - difluorocyclopropenyl)-estra-1,3,5(10)-trien-17β-ol 17-acetate which is recrystallized from methanol.

Example 2

A suspension of 0.5 g. of 5% palladium-on-carbon catalyst in 50 ml. of methanol is hydrogenated for 30 minutes. A solution of 2 g. of 1,3-dimethoxy-17α-(2,2'-difluorocyclopropenyl)-estra-1,3,5(10)-trien-17β - ol 17-acetate in 200 ml. of methanol is added and hydrogenated with agitation until the uptake of hydrogen ceases. The catalyst is removed by filtration and the filtrate is evaporated to yield 1,3-dimethoxy-17α-(2',2'-difluorocyclopropyl)-estra-1,3,5(10)-trien-17β-ol 17-acetate which can be recrystallized from methylene chloride:hexane for further purification.

Example 3

A mixture of 1 g. of 1,3-dimethoxy-17α-(2',2'-difluorocyclopropenyl)-17β-acetoxyestra-1,3,5(10)-triene and 25 ml. of 90% aqueous formic acid is stirred at room temperature for 30 minutes. The mixture is then added to a 5% aqueous sodium bicarbonate solution which is then extracted with ethyl acetate. The ethyl acetate extracts are combined, washed, dried and evaporated to dryness to furnish 1,3-dimethoxy-17α-oxocyclopropenyl-17β-acetoxyestra-1,3,5(10)-triene which is recrystallized from acetone.

Example 4

To 144 mg. of sodium hydride in 8.5 ml. of anhydrous dimethyl sulfoxide, there is added under nitrogen 402 mg. of 1,3 - dimethoxy-17α-(2',2'-difluorocyclopropenyl)-17β-acetoxyestra-1,3,5(10)-triene in 2 ml. of anhydrous dimethyl sulfoxide and the mixture stirred for 30 minutes. To the mixture, there is then added 2 ml. of methyl iodide in 2 ml. of anhydrous dimethyl sulfoxide and the resulting mixture is stirred for 30 minutes. The reaction mixture is then filtered and the filtrate evaporated to dryness under reduced pressure. The residue is dissolved in ether and filtered. The filtrate is evaporated to dryness to give a residue which is chromatographed on Florisil eluting with hexane:ether to give 1,3-dimethoxy-17α-(2',2'-difluoro-3'-methylcyclopropenyl) - 17β - acetoxyestra - 1,3,5(10)-triene and then eluting with ethylacetate to give 1,3-dimethoxy - 17α - (2' - oxo - 3' - methylcyclopropenyl)-17β-acetoxyestra-1,3,5(10)-triene.

Example 5

To 3.2 ml. of cold (0°) concentrated hydrochloric acid is added with stirring, 0.1 g. of 1,3-dimethoxy-17α-(2',2'-difluorocyclopropenyl) - 17β - acetoxyestra - 1,3,5(10)-triene. The mixture is stirred until the steroid is completely dissolved, then stirred for one additional minute, and finally poured into a mixture of aqueous sodium bicarbonate and ethyl acetate. The organic layer is separated and the aqueous phase extracted with ethyl acetate. The combined organic solutions are then washed with water to neutrality, dried over sodium sulfate and evaporated to dryness to yield 1,3-dimethoxy-17α-oxocyclopropenyl-17β-acetoxyestra-1,3,5(10)-triene which may be further purified through recrystallization from methanol.

Example 6

The process of Example 1 is repeated with the exception that an equivalent amount of 1,3,17β-triacetoxy-17α-ethynylestra-1,3,5(10)-triene,
17β-acetoxy-17α-ethynylestra-1,3,5(10)-triene-1,3-diol,
17β-acetoxy-17α-ethynyl-1,3-di(tetrahydropyran-2'-yloxy)-estra-1,3,5(10)-triene,
1,3-diacetoxy-17α-ethynyl-17β-methoxyestra-1,3,5(10)-triene,
1,3-dicyclopentyloxy-17α-ethynyl-17β-acetoxyestra-1,3,5(10)-triene,
3-cyclopentyloxy-17β-acetoxy-17α-ethynylestra-1,3,5(10)-trien-1-ol,
3-cyclopentyloxy-1,17β-diacetoxy-17α-ethynylestra-1,3,5(10)-triene,
1,3,17β-triacetoxy-17α-ethynyl-18-methylestra-1,3,5(10)-triene, and
1,3,17β-trimethoxy-17α-ethynylestra-1,3,5(10)-triene is used as the starting material in place of 1,3-dimethoxy-17α-ethynyl-17β-acetoxyestra-1,3,5(10)-triene and the corresponding 17α-(2',2'-difluorocyclopropenyl) compound is obtained.

By repeating the above process using an equivalent amount of sodium trichloroacetate in place of sodium chlorodifluoroacetate, the corresponding 17α-(2',2'-dichlorocyclopropenyl) compound is obtained, e.g. 1,3-dimethoxy - 17α - (2',2' - dichlorocyclopropenyl) - 17β-acetoxyestra-1,3,5(10)-triene, and 1,3,17β-triacetoxy-17α-(2',2'-dichlorocyclopropenyl)-estra-1,3,5(10)-triene.

Example 7

By repeating the process of Example 1 with the exception of using an equivalent amount of sodium dichlorofluoroacetate in place of sodium chlorodifluoroacetate, there is obtained 1,3-dimethoxy-17α-(2'-chloro-2'-fluorocyclopropenyl)-17β-acetoxyestra-1,3,5(10) - triene which can be subjected to the process of Example 2 to obtain 1,3 - dimethoxy - 17α - (2' - chloro - 2' - fluorocyclopropyl)-17β-acetoxyestra-1,3,5(10)-triene.

By repeating the process of Example 1 using an equivalent amount of 1,3-dimethoxy-17α-fluoroethynyl-17β-acetoxyestra-1,3,5(10)-triene in place of 1,3-dimethoxy-17α-ethynyl-17β-acetoxyestra-1,3,5(10)-triene as the starting material, there is obtained 1,3-dimethoxy-17α-(2',2',3'-trifluorocyclopropenyl)-17β-acetoxyestra-1,3,5(10)-triene.

Example 8

One gram of 1,3,17β-triacetoxy-17α-ethynylestra-1,3,5-(10)-triene is allowed to stand at room temperature for 15 hours with 100 mg. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 1,17 β- diacetoxy - 17α - ethynylestra - 1,3,5(10) - trien-3-ol which is collected by filtration and recrystallized from acetone:hexane.

A solution of one chemical equivalent of the above prepared 3-hydroxy compound in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 3-cyclopentyloxy-1,17β-diacetoxy-17α-ethynylestra-1,3,5(10)-triene which is further purified upon recrystallization from pentane.

The above prepared compound is then subjected to the process of Example 1 and there is obtained 3-cyclopentyloxy - 1,17β - diacetoxy - 17α - (2',2' - difluorocyclopropenyl)-estra-1,3,5(10)-triene.

A solution of 0.17 g. of potassium hydroxide in 0.2 ml. of water and 2.5 ml. of methanol is added over 30 minutes to a refluxing solution of 1 g. of 3-cyclopentyloxy-1,17β-diacetoxy-17α-(2',2'-difluorocyclopropenyl) - estra-1,3,5(10)-triene in 30 ml. of methanol under nitrogen. The solution is refluxed for two hours, cooled, neutralized with acetic acid and concentrated under reduced pressure. After the addition of water, the solid which forms is collected by filtration and dried to yield 3-cyclopentyloxy-17α - (2',2' - difluorocyclopropenyl) - estra - 1,3,5(10)-triene-1,17β-diol which is recrystallized from acetone: hexane.

Example 9

The process of Example 1 is repeated with the exception that an equivalent amount of 17α-ethynyl-1,3-dicyclopentyloxy - 17β - acetoxyestra - 1,3,5(10) - triene, 17α-ethynyl - 1,3 - diacetoxy - 17β - (tetrahydropyran-2'-yloxy) - estra - 1,3,5(10) - triene, 17α - ethynyl - 17β - (tetrahydropyran - 2' - yloxy) - estra - 1,3,5(10) - triene - 1,3-diol and 17α-ethynylestra - 1,3,5(10)-triene - 1,3,17β-triol is used as the starting material in place of 1,3-dimethoxy-17α-ethynyl - 17β - acetoxyestra - 1,3,5(10)-triene and the corresponding 17α-(2',2'-difluorocyclopropenyl) compound is obtained.

A solution of one chemical equivalent of 17α-ethynyl-17β-acetoxyestra-1,3,5(10)-triene-1,3-diol in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 1,3 - dicyclopentyloxy - 17α - ethynyl - 17β -acetoxyestra-1,3,5(10)-triene which is further purified upon recrystallization from pentane.

Example 10

One gram of 3 - cyclopentyloxy - 1,17β - diacetoxy - 17α - (2',2' - difluorocyclopropenyl) - estra - 1,3,5(10) - triene is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 3 - cyclopentyloxy -17β - acetoxy - 17α - (2',2' - difluorocyclopropenyl) - estra - 1,3,5(10) - trien - 1 - ol which is collected by filtration and recrystallized from acetone: hexane.

Example 11

Two milliliters of dihydrofuran are added to a solution of 1 g. of 1,3-dimethoxy-17α-(2',2'-difluorocyclopropenyl)-estra-1,3,5(10) - trien - 17β-ol in 15 ml. of benzene. About 1 ml. is removed by distillation to remove moisture and 0.4 g. of p-toluenesulfonic acid is added to the cooled solution. This mixture is allowed to stand at room temperature for four days, and is then washed with aqueous sodium carbonate solution and water, dried and evaporated. The residue is chromatographed on neutral alumina, eluting with hexane, to yield 1,3-dimethoxy-17α-(2',2'-difluorocyclopropenyl) - 17β - (tetrahydrofuran-2'-yloxy)-estra-1,3,5(10)-triene which is recrystallized from pentane.

Use of this process with the other free hydroxy compounds of the present invention will similarly yield the corresponding (tetrahydrofuran-2'-yloxy) derivatives. Likewise, through the use of dihydropyran in place of dihydrofuran, the corresponding tetrahydropyran - 2' - yl ethers are obtained.

What is claimed is:
1. A compound selected from those of the following formula:

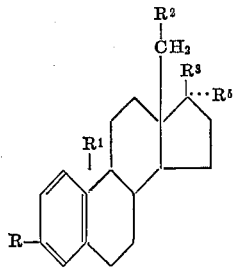

wherein, $R^5$ is selected from the groups

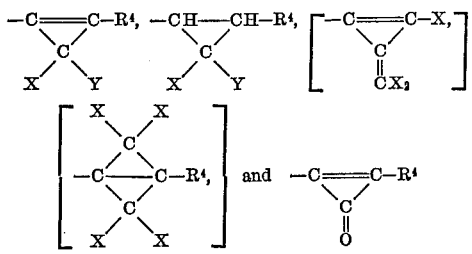

each of X and Y is chloro or fluoro;
each of R, $R^1$ and $R^3$ is hydroxy and the conventional hydrolyzable esters thereof, lower alkoxy, cyclopentyloxy, cyclohexyloxy, tetrahydrofuran-2′-yloxy or tetrahydropyran-2′-yloxy;
$R^2$ is hydrogen, methyl, ethyl or n-propyl; and
$R^4$ is hydrogen, methyl, ethyl, chloro, fluoro or trifluoromethyl.

2. A compound according to claim 1 wherein $R^5$ is the group

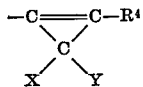

wherein $R^4$, X and Y are as defined therein.

3. A compound according to claim 2 wherein each of X and Y is fluoro.

4. A compound according to claim 2 wherein each of X and Y is fluoro and each of R, $R^1$ and $R^3$ is acetoxy and $R^4$ is hydrogen.

5. A compound according to claim 2 wherein each of X and Y is fluoro, each of R and $R^1$ is methoxy, $R^3$ is acetoxy and $R^4$ is hydrogen.

6. A compound according to claim 2 wherein each of X and Y is fluoro, each of R, $R^1$ and $R^3$ is hydroxy and $R^4$ is hydrogen.

7. A compound according to claim 2 wherein each of X and Y is fluoro, each of R and $R^1$ is hydroxy, $R^3$ is acetoxy and $R^4$ is hydrogen.

8. A compound according to claim 2 wherein each of X and Y is fluoro, each of R and $R^1$ is acetoxy, $R^3$ is methoxy and $R^4$ is hydrogen.

9. A compound according to claim 2 wherein each of X and Y is fluoro, each of R and $R^1$ is hydroxy, $R^3$ is tetrahydropyran-2′-yloxy and $R^4$ is hydrogen.

10. A compound according to claim 2 wherein each of X and Y is fluoro, each of R and $R^1$ is acetoxy, $R^3$ is tetrahydropyran-2′-yloxy and $R^4$ is hydrogen.

11. A compound according to claim 2 wherein each of X and Y is fluoro, each of R and $R^1$ is cyclopentyloxy, $R^3$ is acetoxy and $R^4$ is hydrogen.

12. A compound according to claim 2 wherein each of X and Y is fluoro, R is cyclopentyloxy, $R^1$ is hydroxy, $R^3$ is acetoxy and $R^4$ is hydrogen.

13. A compound according to claim 2 wherein each of X and Y is fluoro, R is cyclopentyloxy, each of $R^1$ and $R^3$ is acetoxy and $R^4$ is hydrogen.

References Cited
UNITED STATES PATENTS

| | | | |
|---|---|---|---|
| 2,861,086 | 11/1958 | Jiu | 260—397.4 |
| 3,385,871 | 5/1968 | Edwards et al. | 260—397.4 |
| 3,392,165 | 7/1968 | Edwards et al. | 260—239.55 |

LEWIS GOTTS, Primary Examiner

ETHEL G. LOVE, Assistant Examiner

U.S. Cl. X.R.

260—239.5, 397.5, 999

UNITED STATES PATENT OFFICE
CERTIFICATE OF CORRECTION

Patent No. 3,478,019           Dated November 11, 1969

Inventor(s) John A. Edwards

It is certified that error appears in the above-identified patent and that said Letters Patent are hereby corrected as shown below:

Column 7, in Claim 1, lines 16 through 25, cancel the material in brackets depicted as follows:

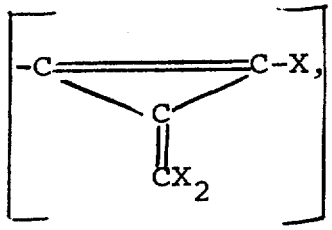

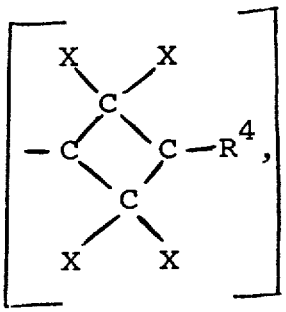

SIGNED AND
SEALED
JUN 23 1970

(SEAL)
Attest:

Edward M. Fletcher, Jr.
Attesting Officer

WILLIAM E. SCHUYLER, JR.
Commissioner of Patents